Jan. 7, 1969  H. G. MUHLBAUER  3,420,828
PROCESS FOR PRODUCING N-METHOXY ETHYL MORPHOLINE
SUBSTANTIALLY FREE OF BETA, BETA
DIAMINODIETHYL ETHER
Filed Aug. 18, 1965
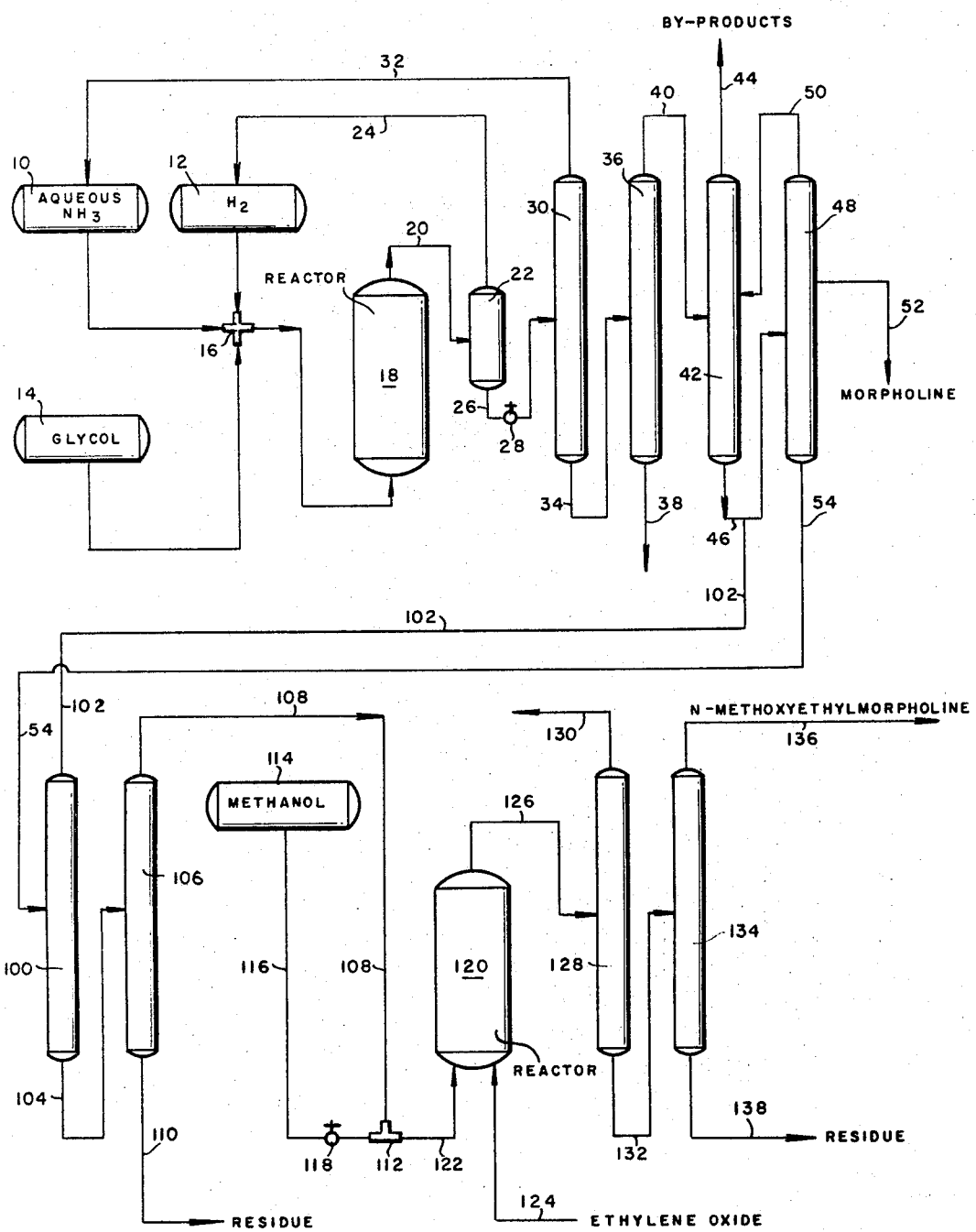
INVENTOR.
HERBERT G. MUHLBAUER,
BY
ATTORNEY.

3,420,828
Patented Jan. 7, 1969

1

3,420,828
PROCESS FOR PRODUCING N-METHOXY ETHYL MORPHOLINE SUBSTANTIALLY FREE OF BETA, BETA DIAMINODIETHYL ETHER
Herbert G. Muhlbauer, Austin, Tex., assignor to Jefferson Chemical Company, Inc., Houston, Tex., a corporation of Delaware
Filed Aug. 18, 1965, Ser. No. 480,702
U.S. Cl. 260—247.7        5 Claims
Int. Cl. C07d 87/32

ABSTRACT OF THE DISCLOSURE

N-methoxyethylmorpholine can be obtained as a purified by-product when morpholine is prepared by the reaction of diethylene glycol with ammonia in the presence of hydrogen by the treatment of a heart-cut by-product N-methoxyethylmorpholine stream with ethylene oxide, following which an N-methoxyethylmorpholine product having a purity of more than 95% is obtained by distillation.

---

This invention relates to a method for the preparation of N-methoxyethylmorpholine. More particularly, this invention relates to an improved method for the production and purification of N-methoxyethylmorpholine from diethylene glycol and ammonia.

There is disclosed in Advani et al. U.S. Patent No. 3,151,113, a method for the production of morpholine from diethylene glycol and ammonia. As is pointed out in this patent, one of the by-products of this process is N-methoxyethylmorpholine. This material, useful as a solvent, is recovered in purified form, however, only with great difficulty. I have been unable to discover a method for obtaining N-methoxyethylmorpholine from the process by distillation in a purity of more than about 95 wt. percent. I have also discovered that this is principally due to the presence of β,β'-diaminodiethylether as a contaminant.

I have now surprisingly discovered in accordance with the present invention, however, that N-methoxyethylmorpholine can be obtained as a purified by-product when morpholine is prepared by the reaction of diethylene glycol with ammonia in the presence of hydrogen, as disclosed, for example, in said Advani et al. U.S. Patent No. 3,151,-113. A feature of the present invention is the treatment of a heart-cut by-product stream, obtained in a manner to be described, with ethylene oxide, following which a N-methoxyethylmorpholine product having a purity of more than 95% is obtained by distillation. Another feature of the present invention is the use of a solvent reactive with ethylene oxide for the ethoxylation. A highly desirable feature of the present invention is the use of water or methanol as a solvent, whereby a N-methoxyethylmorpholine product having a purity of 99% or more is obtained.

Only a minor amount of solvent is necessary (e.g., 1% to 10%, based on the ethoxylation reactor feed), but larger amounts may be used, if desired.

The process of the present invention may be conducted as a batch process, a continuous process or a semi-continuous process.

2

As adduced from the foregoing, the method of the present invention may be defined as a method for preparing N-methoxyethylmorpholine of the formula:

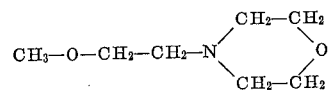

said method comprising the steps of:

(A) contacting hydrogen, diethylene glycol and ammonia with a hydrogenation catalyst under liquid phase reaction conditions, including a temperature in the range from about 150° to 300° C., to provide a reaction product comprising morpholine and N-methoxyethylmorpholine.

(B) recovering a morpholine product fraction and an impure N-methoxyethylmorpholine by-product fraction from the products of said reaction, (C) treating said by-product fraction with ethylene oxide, preferably in the presence of a minor amount of water or methanol, and (D) recovering purified N-methoxyethylmorpholine from the ethoxylation product.

The invention will be further illustrated with reference to the accompanying drawing wherein the single figure is a schematic flow sheet illustrating a preferred embodiment of the present invention.

Turning now to the drawing, there is disclosed a method for the sequential production of morpholine and N-methoxyethylmorpholine. In accordance with this showing, an aqueous solution of ammonia from a storage tank 10, hydrogen from a storage tank 12 and diethylene glycol from the storage tank 14 are charged through a suitable manifold 16 to a reactor 18 containing an appropriate hydrogenation catalyst such as a catalyst containing nickel, copper and chromium oxide, as described in Advani U.S. Patent No. 3,151,113. Within the reactor 18, at least a portion of the diethylene glycol reacts with ammonia and other components of the reaction mixture present to form morpholine and by-products thereof including diglycolamine, N-methylmorpholine, N-ethylmorpholine, N-methoxyethylmorpholine, N-aminoethylmorpholine, β,β'-diaminodiethyl ether, residue components and water.

The total reactor effluent is discharged from reactor 18 by way of a line 20 leading to a separator 22 wherein hydrogen is taken overhead by way of a line 24 for recycle.

The bottoms from separator 22 are discharged by way of a line 26 through a pressure relief valve 28 to a first distillation column 30 wherein water and ammonia are taken overhead by way of a line 32 for recycle to the storage tank 10.

The bottoms from tower 30 are taken by way of a line 34 to a second distillation column 36 wherein the reaction product is separated into an overhead fraction 40 rich in morpholine and a bottoms fraction 38 containing most of the heavy by-products of the reaction, the fraction 38 comprising unreacted diethylene glycol diglycolamine and residue components. The bottoms fraction is discharged by way of a line 38 and may be discarded or further treated up in any suitable manner, such as in the manner described in Advani et al. U.S. Patent No. 3,151,113.

The overhead from tower 36 taken by way of a line 40 will contain water, N-ethylmorpholine, N-methylmorpholine, morpholine, N-methoxyethylmorpholine, diglycolamine, etc. This stream is charged to a third column 42 wherein a discard fraction comprising water, N-ethylmorpholine and N-methylmorpholine is taken overhead by line 44. The bottoms from tower 42 is charged by way of a line 46 to a fourth column 48 wherein the material is separated into a light overhead fraction 50 which is recycled to the tower 42, a heart-cut distillate fraction 52 consisting essentially of morpholine which is taken as product and a bottoms fraction 54. Normally, the fraction 54 will contain less than about 50% morpholine. The fraction 54 will also normally contain from about 20 to about 70 wt. percent of N-methoxyethylmorpholine, the balance consisting primarily of diglycolamine, $\beta,\beta'$-diaminodiethyl ether, N-aminoethylmorpholine and other heavier compounds.

In accordance with the present invention, fraction 54 is utilized to obtain a heart-cut fraction which is used as a feed stock for the purification of N-methoxyethylmorpholine.

In accordance with the present invention, the fraction 54 is charged to a distillation column 100, which is suitably a vacuum distillation column, and topped to provide a distillate fraction 102, which is suitably recycled to the feed line 46 for the column 48, and a bottoms fraction 104. Bottoms fraction 104 is charged to a distillation column 106, which is also suitably a vacuum distillation column, and there separated into a distillate fraction 108 containing most of the N-methoxyethylmorpholine initially present in the fraction 54, and a bottoms fraction 110, which is suitably discarded as a residue fraction.

The fraction 108 may contain as much as 95% of N-methoxyethylmorpholine, but will also contain a minor amount (e.g., 3% to 10%) of $\beta,\beta'$-diaminoethyl ether. In accordance with the preferred embodiment of the present invention, the fraction 108 is charged to a manifold 112 where it is mixed with a minor amount (such as 2 to 10 wt. percent of a reactive solvent (preferably methanol), which is charged to the manifold 112 from a suitable source, such as storage tank 114, by way of a line 116 controlled by a valve 118. The mixture is discharged from the manifold 112 to a reactor 120 by way of a line 122. A scavenging amount of ethylene oxide (e.g., 2 to 20 wt. percent, based on the fraction 108) is also charged to reactor 120 by charge line 124. It will be understood that it is not obsolutely necessary to use a solvent, but it has been discovered in accordance with the present invention that the best results are obtained when a minor amount of an ethylene oxide reactive solvent such as methanol or water is employed during the ethoxylation step. The ethoxylation is conducted under conventional ethoxylation conditions known to those skilled in the art, such as a temperature of about 50° to about 150° C. and a pressure of about 0 to about 100 p.s.i.g.

The ethoxylation product is discharged from reactor 120 by a line 126 leading to a distillation column 128 such as a vacuum distillation column, where the product is topped to provide a distillate fraction 130, and a bottoms fraction 132 which is, in turn, charged to a suitable distillation column 134, such as vacuum distillation column, where a purified N-methoxyethylmorpholine distillate fraction 136 is obtained which will have a purity in excess of 95% (e.g., 99+%). A bottoms fraction 138 is discarded from the column 134 as a residue.

The invention will be further illustrated by the following specific examples, which are given by way of illustration and not as limitations on the scope of this invention.

EXAMPLE I

A heart-cut fraction 108 was obtained in the manner described above which contained about 95 wt. percent of N-methoxyethylmorpholine, about 3.5 wt. percent of $\beta,\beta'$-diaminodiethyl ether and other impurities. Representative portions of this fraction were subjected to a scavenging ethoxylation reaction under a variety of conditions, as set forth in Table I, with the results that are also noted in the table.

TABLE I—ETHOXYLATION OF IMPURITIES IN N-METHOXYETHYLMORPHOLINE

| Charge, pts. by wt. | | | Temp., °C. | Time, hrs. | $\beta,\beta'$-Diaminodiethyl ether in product, wt. percent |
|---|---|---|---|---|---|
| MEM [1] | Other | EO [2] | | | |
| 1,000 | None | 30 | 90 | 3 | 2.0 |
|  |  | 30 | 120 | 3 | 0.4 |
| 700 | do | 50 | 124 | 2 | 1.2 |
| 700 | 50 g. water | 50 | 90 | 2 | 0.03 |
| 700 | 3.5 g. NaOH | 50 | 120 | 2 | 2.3 |
| 700 | 50 g. methanol | 50 | 93 | 2 | 0.1 |

[1] N-methoxyethylmorpholine feed, having an initial $\beta,\beta'$-diaminodiethyl ether content of about 3.5 wt. percent.
[2] Ethylene oxide.

As can be seen from the table, good results were obtained when the ethylene oxide was used alone, in that there was a significant reduction in the $\beta,\beta'$-diaminodiethyl ether content. No particular advantage was observed through the addition of an extraneous ethoxylation catalyst, such as caustic, but a significant improvement was obtained when reactive solvents such as water and methanol were employed.

EXAMPLE II

A heart-cut fraction 108, obtained in the described manner, was found, on analysis, to have an equivalent weight of 139.5 (theoretical for N-methoxymorpholine is 145.2) and a primary amine content of 0.3 meq./g. Twenty-five parts of methanol were mixed with 100 parts by weight of this product, and about 50 parts by weight of ethylene oxide were added to the mixture and allowed to react therewith at 15 p.s.i.g. and 90° C. for a five-hour period. The reaction product was then redistilled under the identical distillation conditions employed in obtaining the initial heart-cut fraction. The final distillation product had an equivalent weight of 144.4, a negligible primary amine content and a purity analysis of 99%.

Having thus described my invention, what is claimed is:

1. In a method which comprises the steps of contacting hydrogen, diethylene glycol and ammonia with a hydrogenation catalyst under liquid phase reaction conditions to provide a reaction product containing morpholine, N-methoxyethylmorpholine and $\beta,\beta'$-diaminodiethylether, the improvement which comprises recovering an N-methoxyethylmorpholine fraction containing $\beta,\beta'$-diaminodiethylether from said reaction product, contacting said N-methoxyethylmorpholine fraction with ethylene oxide to ethoxylate said $\beta,\beta'$-diaminodiethylether and distilling said thus treated N-methoxyethylmorpholine fraction to obtain an N-methoxyethylmorpholine product having an N-methoxyethylmorpholine content of more than 95 wt. percent.

2. A method as in claim 1 wherein the ethoxylation is conducted in the presence of about 1 to 10 wt. percent, based on said N-methoxyethylmorpholine fraction, of a solvent selected from the class consisting of methanol and water.

3. A method as in claim 2 wherein the solvent is methanol.

4. A method as in claim 2 wherein the solvent is water.

5. In a process as in claim 1 wherein the process is continuous, the improvement which comprises:

separating said N-methoxyethylmorpholine fraction into a heart-cut fraction containing up to about 95% of N-methoxyethylmorpholine, contacting said heart-cut fraction with 1 to 10 wt. percent of methanol and from about 2 to about 10 wt. percent of ethylene oxide under liquid phase ethoxylation conditions including a temperature within the range of 50° to 150° C. to provide an ethoxylation reaction product, and distilling said ethoxylation product to provide a fraction consisting essentially of N-methoxyethylmorpholine.

References Cited

UNITED STATES PATENTS 3,151,113   9/1964   Advani et al. _____ 260—247

NICHOLAS S. RIZZO, *Primary Examiner.*

J. TOVAR, *Assistant Examiner.*

U.S. Cl. X.R.

260—584